United States Patent Office 2,745,749
Patented May 15, 1956

2,745,749

GLYCERIDIC MIXTURES EXHIBITING UNIQUE PROPERTIES AND PROCESS FOR THEIR PRODUCTION

Reuben O. Feuge, New Orleans, Earl J. Vicknair, Marrero, and Klare S. Markley, New Orleans, La., assignors to the United States of America as represented by the Secretary of Agriculture No Drawing. Application July 19, 1951, Serial No. 237,658

12 Claims. (Cl. 99—118)

(Granted under Title 35, U. S. Code (1952), sec. 266)

The invention herein described may be manufactured by or for the Government of the United States of America for governmental purposes throughout the world without the payment to us of any royalty thereon.

This invention relates to a process for chemically modifying certain glyceridic mixtures so that the modified mixture exhibits the properties of texture, melting point, flexibility and the like desired for a particular utilization. More particularly, the invention provides glyceridic mixtures exhibiting unique and valuable properties; and provides a process for their production by the controlled acylation of mixtures which are composed of glycerides of long-chain fatty acids and which contain substantial proportions of monoglycerides.

Glyceridic mixtures (i. e. fats) having the properties of texture, melting point, flexibility and the like suitable for a given use and also retaining the chemical properties of mixtures of saturated fatty acid esters of glycerol have a wide range of valuable application. Such mixtures are miscible with many organic compounds by virtue of their high carboalkoxy group content and are relatively resistant to oxidation by virtue of the fact that their hydrocarbon chains are saturated aliphatic chains. The mixtures provide particularly valuable plasticizers, lubricants and the like. Where the mixtures contain no acyl radicals exhibiting toxic physiological properties, they are edible fats and have unique value in food and drug applications.

The step of acylating a mixture of glycerides containing some monoglycerides is not in itself new. Some commonly used methods of determining the hydroxyl value of a fat or oil involve its acylation. However, in such processes, the acylation is conducted solely for the purpose of determining this analytical value of the glyceridic mixture. To accomplish this, a small amount of fat is reacted with a large excess of acylating agent and the product so produced is immediately dissolved or in other ways disposed of so that the amount of acylating agent used up in the reaction can be determined.

We have discovered that when a mixture of glycerides of long chain saturated fatty acids containing substantial portions of long chain monoglycerides is acylated under controlled conditions with the introduction of saturated fatty acid acyl groups of relatively short chain length, i. e., two to six carbon atoms, so that only a portion of the hydroxyl groups contained in the mixture are acylated while the mixture is unchanged in its chemical nature in that it is still a mixture of glycerides of saturated fatty acids, the mixture exhibits totally different properties of texture, melting point, flexibility and the like.

For example, when mixtures of glycerides principally consisting of monostearates or mixtures of monostearates and monopalmitates are subjected to acylation, under conditions not conducive to interesterification, until the hydroxyl value of the acylated mixture is between about 15 to 200 and the monoglyceride content of the acylated mixture is between about 0.1 to 30% a unique edible fat is produced. While in fats, properties of nongreasiness and flexibility are normally mutually exclusive, the edible fats so produced are either nongreasy, flexible solids or liquids.

Mixtures of glycerides, which contain at least 50% monoglycerides, in which stearates or stearates and palmitates constitute the only components present in more than small amounts, constitute the preferred starting materials for employment in the present process. As is well known to those skilled in the art, such mixtures vary in their physical properties. Where it is desired to impart to such mixtures (e. g., those containing relatively large amounts of the higher melting di- and triglycerides) a high degree of flexibility by the process of the present invention, it is preferable that the acylation be continued until the monoglyceride content is reduced to a relatively low value.

The step of acylating the glyceridic mixtures in accordance with the process of the present invention can be conducted in any conventional manner involving acylating agents and conditions which are not conducive to high rates of interesterification. Acids, acid anhydrides and acyl halides can suitably be employed as the acylating agents. The reaction conditions most conducive to acylation in the absence of interesterification are well known to those skilled in the art.

The choice of the individual acyl radicals introduced markedly affects the properties of melting point, flexibility and the like of the acylated mixture. The acyl radicals of the lower molecular weight anhydride-forming fatty acids, particularly those of acetic, propionic and butyric acid are the ones preferred for introduction in accordance with the process of the present invention. While acylated mixtures melting above normal room temperature can readily be produced by the introduction of the proper amounts of acetyl and propionyl radicals, the introduction of appreciable amounts of butyryl radicals tends to produce mixtures which are liquid at room temperature.

The acylation reaction involved in the process of the invention is controlled by the selection of reaction conditions favoring acylation over interesterification and by sampling and analyzing the acylated mixture for hydroxyl value and monoglyceride content. Sampling and analyses can be conducted in the conventional manner. Use of about the stoichiometric equivalent or less of the acylating agent is preferred. The reaction can be conducted in a continuous or batchwise manner under normal, super or subatmospheric pressure.

The following examples are presented to illustrate in more detail certain features involved in the practice of the invention. However, as it is apparent that numerous variations can be made, the scope of the invention is defined by the claims and is not to be construed as being limited to the particular materials and conditions recited in the examples.

Three mixtures composed of stearates and mixed stearates and palmitates were acetylated in accordance with the particularly preferred method of conducting the process of the invention to form a series of 9 acetylated mixtures having hydroxyl values of from about 35 to 170 and monoglyceride contents of from about 0.1 to 20%. These acetylated mixtures constitute particularly preferred flexible solid compositions provided by the invention. They are edible and nongreasy. They have many potential uses in the food industry, for example, as coatings for eviscerated poultry, other meat products, cheese, candies, ice cream bars and the like. They are as easy to apply as paraffin and have the same texture and feel, but are at least six times more flexible. They are impervious to moisture and resistant to the attack of molds and bacteria.

The mixtures which were so acetylated are hereinafter referred to as monostearates A, B, and C. Monostearate A was prepared from pure stearic acid by the method of Gros et al. (J. Am. Oil Chemists' Soc., 28, 1–4, 1951); it contained 99.2% monostearate by analysis (Handschumaker, E., and Linteris, L., J. Am. Oil Chemists' Soc., 24, 143–145, 1947) and had a hydroxyl value of 306.5 according to the acetylation method of West et al. (J. Biol. Chem., 104, 627–634, 1934) modified by using one part of acetic anhydride to three parts of pyridine. Monostearate B was a commercial, molecularly distilled product. It had a hydroxyl value of 335.5 and a monoglyceride content of 91.5%. The average molecular weight of the combined fatty acids in this product was 270.5, which corresponds to a 1:1 ratio of stearic and palmitic acids. Monostearate C was a technical grade product made from completely hydrogenated cottonseed oil. Its hydroxyl value was 236.9, and it contained 61.0% monoglycerides of fatty acids having an average molecular weight of 280.0.

The monostearates were acetylated in the following manner to produce the acetylated mixtures hereinafter referred to as acetostearates, those from monostearate A being designated by A–1, A–2, those from monostearate B being designated by B–4, B–5, etc. The acetostearates were prepared by reacting acetic anhydride with monostearate. A temperature of 110° C. and a reaction time of one hour was used in most instances. The reactants were stirred and were kept under dry hydrogen to prevent reaction of the acetic anhydride with atmospheric moisture. The reaction was interrupted as desired by adding hot water to the reaction mixture and stirring for 10 minutes to hydrolyze the unreacted acetic anhydride. After washing the reaction product with distilled water it was dried by warming it under reduced pressure and stripping with hydrogen.

The physical properties of the acetostearates formed by reaction of monostearate with acetic anhydride could be controlled to a considerable extent by manipulating the reaction time, temperature, and proportion of acetic anhydride employed. None of the reactions was carried to completion, as evidenced by the hydroxyl value of the finished products.

The ratios of monostearate to acetic anhydride used in making the products subjected to elongation and bending tests were such that one equivalent of hydroxyl in the monostearate was mixed with 0.5, 1.0, and 2.0 moles of acetic anhydride, respectively. The reactions were stopped after one hour at 110° C.

The free fatty acid content of the acetostearates was nearly always between 1.0 and 1.5%, which is quite low in view of the fact that two of the monostearates used to prepare the products contained several tenths of a percent of free fatty acids. Therefore, it must be concluded that reaction occurred by direct acetylation, uncomplicated by interesterification. The short melting range of the products prepared with monostearates A and B, which in one case was less than a degree, and the fact that monostearates are relatively stable when heated to 110° C. in glacial acetic acid substantiate the validity of this conclusion.

The flexibilities of the acetostearates were measured by stretching test samples of each product. This was accomplished by heating the acetostearates to 60° C., pouring them into a mold at the same temperature, and solidifying them by cooling to room temperature (26° C.). After being removed from the mold, the samples were held overnight at 22° C. and tested at the same temperature.

The test samples were formed by casting the melted product in a mold consisting of three plates of ⅛-inch sheet aluminum separated by aluminum foil. The center plate, or mold proper, was cut out to form a ribbon shaped opening. The other two plates were confining faces of the mold.

Each molded test sample measured five inches in length and ⅛ inch in thickness. The center portion of the sample was ¾ inch in width, but one inch from each end the width increased gradually so that the ends were 1¼ inches wide. In making the tests the enlarged end-sections of the sample were covered with fine sand paper and clamped in the jaws of the testing machine. The central section of the sample measuring 3 x ¾ x ⅛ inch was subjected to stretching.

An Instron Tensile Tester was used to stretch the samples. In this machine one of the jaws is pulled away from the other at a contant rate, while the machine automatically records the load or pull necessary to maintain the rate of elongation and synchronizes this value with a recording of the amount of elongation or stretch of the test sample.

The results of the tests made by applying a stretching rate of 1.0 inch per minute are recorded in Table I. Data for tests made with monostearate B and a paraffin (M. P., 50–52° C.) are also included in the table.

TABLE I

*Elongation at break point and resistance to stretching of acetostearates, monostearate, and paraffin*

| Product No. | Mole $(CH_3CO)_2O/$ OH equivalent [a] | Maximum load, lbs. | Load at break, lbs. | Elongation, Percent |
| --- | --- | --- | --- | --- |
| A–1 | 0.5 | 1.7 | | >800 |
| A–2 | 1.0 | 0.71 | | >800 |
| A–3 | 2.0 | 0.49 | | >800 |
| B–4 | 0.5 | 1.6 | 0 | 467 |
| B–5 | 1.0 | 0.43 | 0 | 513 |
| B–6 | 2.0 | 0.32 | | >800 |
| C–7 | 0.5 | 9.8 | 9.1 | 31 |
| C–8 | 1.0 | 6.7 | 0.3 | 241 |
| C–9 | 2.0 | 1.6 | | >800 |
| Monostearate B | | 3.7 | 3.7 | 4 |
| Paraffin | | 8.0 | 8.0 | 5 |

[a] Ratios are moles of acetic anhydride used per OH equivalent in the preparation of the acetostearates.

Each acetostearate shown in Table I stretches far more than either monostearate B or the paraffin. More than half of the acetostearates stretched over 800% which was the limit of the testing machine. The lowest value observed for any of the acetostearates was six times greater than was obtained with paraffin. From the data for the acetostearates prepared from monostearates B and C, it is apparent that the stretchability increased as the proportion of acetic anhydride used to prepare a given product increased.

The relative tenacity or resistance to stretching, which is indicated by the maximum load values in Table I, varied greatly, depending on the type of monostearate and proportion of acetic anhydride employed in the preparation of the acetostearates. The higher proportions of acetic anhydride gave products with the least tenacity because they acetylated greater proportions of the monostearates and transformed them into lower melting compounds.

Products made with monostearate B were not as tenacious as the corresponding products made with monostearate A, probably because the former contained monoglycerides of palmitic and possibly other fatty acids. The use of monostearate C resulted in the toughest products because it contained a large proportion of diglycerides.

The maximum loads shown in Table I are numerically equal to about 1/11 of the stress in pounds per square inch which must be applied to the molded product to start stretching at a rate of 33.3% per minute. A force of 73.7 pounds per square inch had to be applied, for example, to product No. 8 to start it stretching at a rate of 33.3% per minute.

Several of the acetostearates were subjected to stretching at rates other than one inch per minute. The results of these tests are shown in Table II. From the data in Table II it can be seen that even at greatly increased rates of elongation the products flowed like liquids. A 20-fold increase in the rate of elongation resulted in about a 3-fold increase in the load or force necessary to overcome the resistance to stretching. Increased rates of elongation decreased the amount of elongation before the sample ruptured.

TABLE II

*Elongation at break point and resistance to stretching of acetostearates under different rates of elongation*

| Product No. | Rate of elongation, in./min. | Maximum load, lbs. | Load at break, lbs. | Elongation, Percent |
|---|---|---|---|---|
| A-1 | 1 | 1.7 | | >800 |
|     | 5 | 3.2 | 0 | >800 |
|     | 20 | 4.4 | 0 | 547 |
| A-2 | 1 | 0.71 | | >800 |
|     | 20 | 2.2 | 0 | 630 |
| A-3 | 1 | 0.49 | | >800 |
|     | 20 | 1.6 | | >800 |
| B-4 | 1 | 1.6 | 0 | 467 |
|     | 10 | 3.2 | 0 | 350 |
| C-9 | 1 | 1.6 | | >800 |
|     | 5 | 3.0 | 0.3 | 613 |
|     | 10 | 4.2 | 0.8 | 360 |
|     | 20 | 5.4 | 2.2 | 173 |

In order to obtain date on the flexibility on the acetostearates at a temperature other than that of the testing laboratory (22° C.) in which the Instron Tensile Tester was located, bending tests were made at 4° C. on several of the products listed in Table I. For these tests a 5 x ¾ x ⅛ inch ribbon of acetostearate was molded on a strip of high-strength filter paper by using a molding technique similar to that described, except that a sheet of filter paper was substituted for one of the sheets of aluminum foil. The molded product was maintained at 4° C. overnight before testing.

The bending test consisted of fastening one end of the ribbon of acetostearate and filter paper to a brass cylinder one inch in diameter and rotating the cylinder at a rate of 33° per minute while pulling at the other end of the ribbon with a force of two pounds.

Paraffin and monostearate B cracked when tested in this manner. Acetostearates Nos. C-7 and C-8 also cracked; but product Nos. A-2, A-3, B-4, B-5, and B-6 did not crack. Acetostearates Nos. A-1 and C-9 cracked only slightly.

The acetostearates made with monostearate B were also tested in another way, which consisted of placing strips of the products in the freezing compartment of a domestic refrigerator. The products, especially B-5 and B-6 remained pliable at the freezing temperatures.

The melting range of a coating fat is an important physical property. This property of the acetostearates is about as important as flexibility, especially if the products are to be used as edible coatings.

The nine acetostearates listed in Table I were non-greasy solids at room temperature (26° C.), but their melting ranges, determined by the capillary tube method, differed appreciably. The melting ranges, hydroxyl values, and monoglyceride contents of the products are recorded in Table III.

TABLE III

*Melting range, hydroxyl value and monoglyceride content of acetostearates*

| Product No. | Melting range, °C. | Hydroxyl value | Monoglyceride content, percent |
|---|---|---|---|
| A-1 | 45.0-48.0 | 153 | 17.8 |
| A-2 | 39.5-42.0 | 78 | 2.7 |
| A-3 | 38.0-39.0 | 36 | 0.3 |
| B-4 | 41.0-44.0 | 166 | 11.4 |
| B-5 | 32.0-35.5 | 78 | 2.8 |
| B-6 | 29.0-31.0 | 56 | 0.9 |
| C-7 | 44.0-54.0 | 122 | 14.1 |
| C-8 | 38.0-54.0 | 84 | 4.9 |
| C-9 | 35.0-54.0 | 38 | 0.4 |

The lower temperature recorded for each product is the temperature at which melting was first observed; the higher temperature is the one at which the product was completely liquid.

Product No. B-6 began melting at 29° C. and product No. A-1 began melting at 45° C. All of the products except those made with monostearate C have relatively short melting ranges. The shortest melting range observed (product No. A-3) was less than one degree.

While the above glyceridic mixtures having hydroxyl values above about 35 are solids at normal room temperature, glyceridic mixtures having hydroxyl values below about 35, which mixtures are liquid at normal room temperatures, are also provided by the invention. For example, monostearate B was acetylated by the process described above to a hydroxyl value of about 20 and a monoglyceride content of about 0.1. The mixture was a unique completely saturated, colorless, odorless and tasteless oil which exhibited an exceptionally high resistance toward degradation induced by heat and oxidative conditions. When enough propyl gallate was added to this mixture to prevent the oxidation of the oleoyl radical (present due to the fact that the monostearate used contained about 3% olein) the mixture, when subjected to aeration for more than 700 hours at 208° F., exhibited a peroxide value of less than about 3 milli-equivalents of peroxide per kiligram of fat (Accelerated Stability Test Using Peroxide Value as an Index, A. E. King et al. J. Am. Oil Chem. Soc. 10 105-9, 1933) and exhibited no change in color, odor or taste.

Having thus described our invention, we claim:

1. A process which comprises acylating a mixture containing at least 50% monoglycerides of the group consisting of glyceryl monostearate, glyceryl monopalmitate and mixtures thereof with an acylating agent of an unsubstituted saturated alkanoic acid containing from 2 to 4 carbon atoms, and continuing the acylation until a product is obtained having a hydroxyl value of from 15 to 200 and a residual monoglyceride content of from 0.1 to 30%.

2. A process for the production of an edible flexible solid composition which comprises acetylating, a mixture containing at least 50% monoglycerides of the group consisting of glyceryl monostearate, glyceryl monopalmitate and mixtures thereof until the acetylated mixture has a hydroxyl value of from about 37 to 170 and a residual monoglyceride content of from about 0.1 to 20%.

3. A mixture of glycerides comprising from about 0.1 to 30% of monoglycerides from the group consisting of glyceryl monostearate, glyceryl monopalmitate and mixtures thereof and glycerides in which a portion of the hydroxyl groups are acylated by an unsubstituted saturated fatty acid radical of not more than 4 carbon atoms, said mixture having a hydroxyl value of from 15 to 200.

4. A flexible solid composition comprising a mixture of glycerides containing from about 0.1 to 30% of monoglycerides from the group consisting of glyceryl monostearate, glyceryl monopalmitate and mixture thereof and glycerides in which a portion of the hydroxyl groups is acylated by acetyl radicals, said mixture having a hydroxyl value of from 35 to 170.

5. A liquid mixture of glycerides comprising from about 0.1 to 30% monoglycerides from the group consisting of glyceryl monostearate, glyceryl monopalmitate and mixtures thereof and glycerides in which a portion of the hydroxyl groups is acylated by acetyl radicals, said liquid mixture having a hydroxyl value of from about 15 to 35.

6. A heat-resistant and oxidation-resistant liquid fat comprising a mixture of glycerides containing about 0.1% of monoglycerides of the group consisting of glyceryl monostearate, glyceryl monopalmitate and mixtures thereof and glycerides in which a portion of the hydroxyl groups is acylated by acetyl radicals, said mixture having a hydroxyl value of about 20.

7. A process which comprises acylating a mixture containing at least 50% of monoglycerides of the group consisting of glyceryl monostearate, glyceryl monopalmitate and mixtures thereof with an acylating agent of an unsubstituted saturated alkanoic acid containing from 2 to 4 carbon atoms, continuing the acylation until a product is obtained having a hydroxyl value of from 15 to 200 and a residual monoglyceride content of from 0.1 to 30%, and coating an edible article with the acylated product.

8. A process which comprises reacting a fatty mixture containing at least 50% monoglycerides from the group consisting of glyceryl monostearate, glyceryl monopalmitate and mixtures thereof with acetic anhydride, continuing the reaction until the product has a hydroxyl value of from 15 to 200 and a residual monoglyceride content of from 0.1 to 30%, stopping the reaction by adding hot water when the product has attained the aforementioned hydroxyl value and monoglyceride content, and recovering said product from the reaction mixture.

9. The process of claim 1 in which the acylating agent is acetic anhydride.

10. The process of claim 1 in which the acylating agent is an acetylating agent.

11. The process of claim 3 in which the acetylating agent is acetic anhydride.

12. A process of protecting an edible article, which process comprises, coating the article with the composition of claim 5.

References Cited in the file of this patent

UNITED STATES PATENTS

| | | |
|---|---|---|
| 2,145,443 | Harris | Jan. 31, 1939 |
| 2,160,532 | Barrett | May 30, 1939 |
| 2,322,198 | Parsons | June 15, 1943 |
| 2,584,998 | Filachione et al. | Feb. 12, 1952 |
| 2,615,159 | Jackson | Oct. 21, 1952 |
| 2,615,160 | Baur | Oct. 21, 1952 |
| 2,690,971 | Iveson | Oct. 5, 1954 |